United States Patent
Kawaguchi

(10) Patent No.: US 11,983,249 B2
(45) Date of Patent: May 14, 2024

(54) ERROR DETERMINATION APPARATUS, ERROR DETERMINATION METHOD AND PROGRAM

(71) Applicant: NIPPON TELEGRAPH AND TELEPHONE CORPORATION, Tokyo (JP)

(72) Inventor: Hidetoshi Kawaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 356 days.

(21) Appl. No.: 17/593,398

(22) PCT Filed: Mar. 24, 2020

(86) PCT No.: PCT/JP2020/013115
§ 371 (c)(1),
(2) Date: Sep. 17, 2021

(87) PCT Pub. No.: WO2020/196549
PCT Pub. Date: Oct. 1, 2020

(65) Prior Publication Data
US 2022/0180130 A1    Jun. 9, 2022

(30) Foreign Application Priority Data
Mar. 26, 2019  (JP) .................. 2019-057673

(51) Int. Cl.
*G06F 18/25* (2023.01)
*G06F 18/2411* (2023.01)
(Continued)

(52) U.S. Cl.
CPC .... *G06F 18/24323* (2023.01); *G06F 18/2411* (2023.01); *G06F 18/254* (2023.01); *G06N 20/00* (2019.01)

(58) Field of Classification Search
CPC ............. G06F 18/24323; G06F 18/254; G06F 18/2411; G06N 20/00
See application file for complete search history.

(56) References Cited

U.S. PATENT DOCUMENTS

| 2008/0208781 A1* | 8/2008 | Snyder ................. G16H 40/63 706/20 |
| 2018/0089581 A1* | 3/2018 | Zang ..................... G06N 20/00 |
| 2019/0019036 A1* | 1/2019 | Yoo ...................... G06V 10/764 |

FOREIGN PATENT DOCUMENTS

| JP | H09-062648 | 3/1997 |
| JP | 2014-102555 | 6/2014 |

OTHER PUBLICATIONS

Information-technology Promotion Agency, Japan Security Center, "Threat Information Structured Description Format STIX Overview, STIX (Structured Threat Information expression) ~ Specifications for describing cyber attack activities~" last update date : May 31, 2018, https://www.ipa.go.jp/security/vuln/STIX.html.

(Continued)

*Primary Examiner* — Syed Haider
(74) *Attorney, Agent, or Firm* — IPUSA, PLLC

(57) ABSTRACT

An error determination device includes a class estimation process observation unit configured to acquire data in a process of being estimated, from a class estimation unit that estimates a class of data to be classified and generate an estimation process feature vector based on the acquired data; and an error determination unit configured to accept input of the estimation process feature vector generated by the class estimation process observation unit and a classification result output from the class estimation unit and determine whether the classification result is correct or incorrect based on the estimation process feature vector and the classification result, wherein the error determination unit is a functional part generated by machine learning based on an (Continued)

estimation process feature vector list created by adding a pseudo feature vector to an estimation process feature vector list generated by the class estimation process observation unit and on a learning error-correction list indicating that a class corresponding to the pseudo feature vector is incorrect.

4 Claims, 11 Drawing Sheets

(51) Int. Cl.
*G06F 18/243* (2023.01)
*G06N 20/00* (2019.01)

(56) References Cited

OTHER PUBLICATIONS

Information-technology Promotion Agency, Japan Security Center, "TAXII Overview, TAXII (Trusted Automated eXchange of Indicator Information) ~ Specifications for exchanging information on cyber attack activities~" last update date : May 31, 2018, https://www.ipa.go.jp/security/vuln/TAXII.html.

Scikit-learn, "scikit-learn: Machine Learning in Python" download date: Jul. 19, 2021, http://scikit-learn.org/stable/.

* cited by examiner

<CLASS O, CLASS O, CLASS P>

CORRECT CLASS LIST (B)

LEARNING DATA-TO-BE-CLASSIFIED LIST (A)

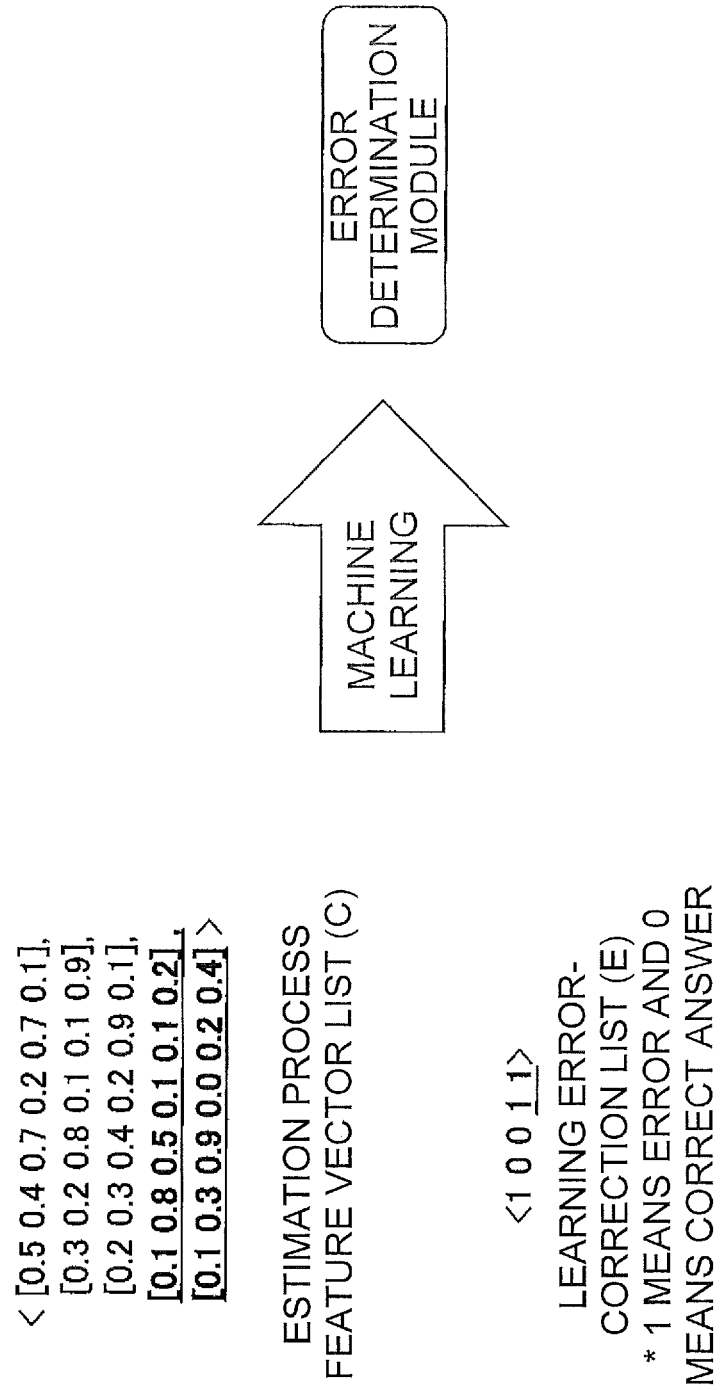

ERROR DETERMINATION APPARATUS, ERROR DETERMINATION METHOD AND PROGRAM

TECHNICAL FIELD

The present invention relates to a technique for classifying information. Examples of fields of application of the present technique include a technique used by security operators who handle security systems, such as IPS (Intrusion Prevention System) or antivirus software, against cyber attacks, i.e., a technique for automatically classifying threat information by a machine learning technique or the like.

BACKGROUND ART

The security operators who handle security systems against cyber attacks gather information about cyber attack activity, including attackers, behavior and tactics of the attackers, vulnerability, and the like, into threat information. Because the threat information has to be generated daily, the security operators need to classify the threat information continuously and serially. Note that examples of the threat information include information described in Non-Patent Literatures 1 and 2.

Examples of conventional techniques for classification include a technique for extracting enormous amounts of data using machine learning and analyzing, classifying, and evaluating the data (see, for example, Non-Patent Literature 3). Also, conventional techniques for classification include a technique for determining whether or not given information is to be classified into a predetermined class based on scores given to classes obtained by entering input information into a classifier (Patent Literature 1).

CITATION LIST

Patent Literature

Patent Literature 1: Japanese Patent Laid-Open No. 2014-102555

Non-Patent Literature

Non-Patent Literature 1: found at https://www.ipa.go.jp/security/vuln/STIX.html, on Aug. 2, 2018
Non-Patent Literature 2: found at https://www.ipa.go.jp/security/vuln/TAXII.html, on Aug. 2, 2018
Non-Patent Literature 3: found at http://www.scikit-learn.org/stabke/, on Aug. 2, 2018

SUMMARY OF THE INVENTION

Technical Problem

As described above, security operators need to classify threat information, but the threat information itself can become too enormous in amount to classify. The inability to classify the threat information means that there may be cases in which cyber attacks cannot be prevented sufficiently, which may be undesirable for organizations trying to maintain security.

In order to evaluate the enormous amounts of threat information completely, it is conceivable to generate patterns from pairs of threat information and a class that serve as learning data, construct a class estimation module, and automatically make classification.

However, with the classification using the class estimation module alone, misclassifications are unavoidable. Threat information needs to be treated sensitively, and there is a problem in that after all, the security operator has to determine whether the threat information is correct or incorrect. Also, although the technique described in Patent Literature 1 can determine whether class separation is correct or incorrect, it is considered that accuracy of the determination is low. Also, it is considered that the technique described in Patent Literature 1 has a low accuracy of correct/incorrect determination on threat information having completely unknown features.

The present invention has been made in view of the above point and has an object to provide a technique for determining, with high accuracy, whether classification is correct or incorrect in an information classification technique.

Means for Solving the Problem

A disclosed technique provides an error determination device comprising: a class estimation process observation unit configured to acquire data in a process of being estimated, from a class estimation unit that estimates a class of data to be classified and generate an estimation process feature vector based on the acquired data; and an error determination unit configured to accept input of the estimation process feature vector generated by the class estimation process observation unit and a classification result output from the class estimation unit and determine whether the classification result is correct or incorrect based on the estimation process feature vector and the classification result, wherein the error determination unit is a functional part generated by machine learning based on an estimation process feature vector list created by adding a pseudo feature vector to an estimation process feature vector list generated by the class estimation process observation unit and on a learning error-correction list indicating that a class corresponding to the pseudo feature vector is incorrect.

Effects of the Invention

The disclosed technique makes it possible to determine, with high accuracy, whether classification is correct or incorrect in an information classification technique.

BRIEF DESCRIPTION OF DRAWINGS

FIG. 11 is a diagram showing the process of S5.

DESCRIPTION OF EMBODIMENTS

An embodiment (the present embodiment) of the present invention will be described below with reference to the drawings. The embodiment described below is only exemplary, and embodiments to which the present invention is applicable are not limited to the embodiment described below.

Functional Configuration of Device

Figure 1:
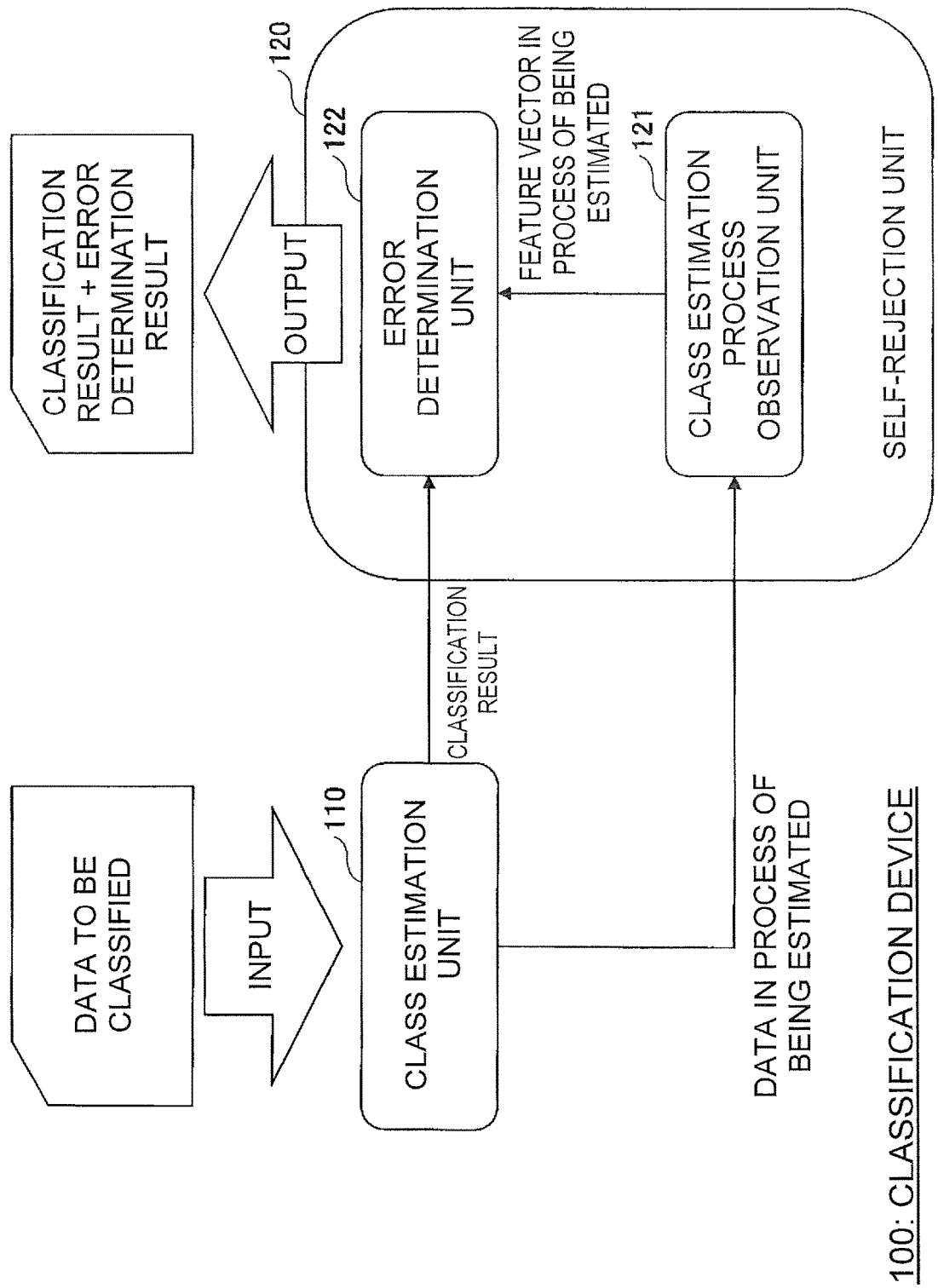
FIG. 1 is a functional configuration diagram of a classification device 100 according to an embodiment of the present invention.

FIG. 1 is a functional configuration diagram of a classification device 100 according to an embodiment of the present invention. As shown in FIG. 1, the classification device 100 includes a class estimation unit 110 and a self-rejection unit 120. The self-rejection unit 120 includes a class estimation process observation unit 121 and an error determination unit 122.

Note that the class estimation unit 110 and self-rejection unit 120 may be made up of separate devices and connected via a network. In that case, the self-rejection unit 120 may be called a self-rejection device or an error determination device. Also, a device including the class estimation unit 110 and self-rejection unit 120 may be called a self-rejection device or an error determination device. Operation of the classification device 100 is outlined below.

Operation Overview

First, data to be classified is input to the class estimation unit 110. The data to be classified is data, such as threat information, desired to be classified in some way or the other using the present system.

The class estimation unit 110 estimates the class of the input data to be classified. The class estimation unit 110 itself is a conventional technique and can be implemented using a technique related to artificial intelligence, such as SVM, neural networks, Bayesian networks, or decision trees.

Classification results of the data to be classified is output from the class estimation unit 110. The classification results are one or more "classes" or "unclear" in a predetermined class list. "Unclear" means that although the class has been estimated by the class estimation unit 110, the accuracy of the classification result is dubious because of a low degrees of certainty.

The class estimation process observation unit 121 observes a calculation process whereby the class of the data to be classified is estimated by the class estimation unit 110, acquires data in the process of being estimated, converts the data into a feature vector, and outputs the feature vector to the error determination unit 122.

The error determination unit 122 receives observation data that is in the process of being estimated, as a feature vector, from the class estimation process observation unit 121 and determines whether the class estimated by the class estimation unit 110 is "correct" or "incorrect" based on the observation data. If the result of the determination is "correct," the class estimated by the class estimation unit 110 is used directly as a classification result, but if the result of the determination is "incorrect," "unclear" is produced as a classification result.

The class estimation process observation unit 121 and error determination unit 122 will be detailed later.

Exemplary Hardware Configuration

The classification device 100 described above (and the self-rejection device and error determination device) can be implemented, for example, by making a computer execute a program in which process details of the present embodiment are described.

That is, the classification device 100 can be implemented by executing programs corresponding to processes run on the classification device 100 using hardware resources such as a built-in CPU or memory of the computer. The programs described above can be saved or distributed by being recorded on a computer-readable recording medium (such as a portable memory). Also, the programs can be provided by means of electronic mail or the like via a network such as the Internet.

Figure 2:
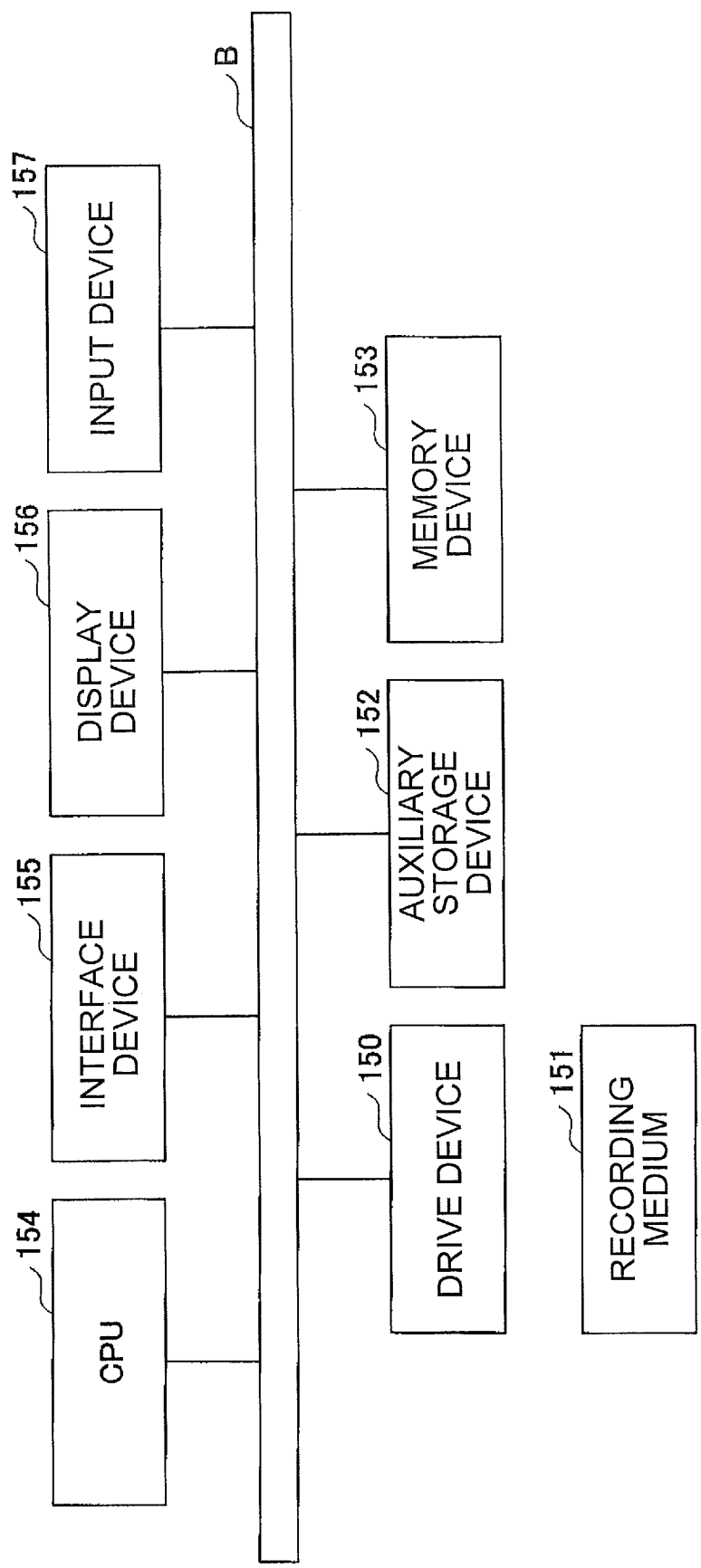
FIG. 2 is a diagram showing an exemplary hardware configuration of the classification device 100.

FIG. 2 is a diagram showing an exemplary hardware configuration of the classification device 100 of the computer according to the present embodiment. The computer in FIG. 2 includes a drive device 150, an auxiliary storage device 152, a memory device 153, a CPU 154, an interface device 155, a display device 156, and an input device 157, which are interconnected via a bus B respectively.

The programs that implement the processes on the computer are provided, for example, via a recording medium 151 such as a CD-ROM or memory card. When the recording medium 151 containing the programs is set in the drive device 150, the programs are installed in the auxiliary storage device 152 from the recording medium 151 via the drive device 150. However, the programs do not necessarily have to be installed from the recording medium 151, and may be downloaded from another computer via a network. The auxiliary storage device 152 stores necessary files, data, and the like as well as the installed programs.

When a program start command is issued, the memory device 153 stores the programs by reading the programs out of the auxiliary storage device 152. According to the programs stored in the memory device 153, the CPU 154 implements functions related to the classification device 100. The interface device 155 is used as an interface for connecting to the network. The display device 156 displays a GUI (Graphical User Interface) and the like provided by the programs. The input device 157 is made up of a keyboard, a mouse, and buttons, or a touch panel and the like, and is used to enter various operating commands.

Details of Class Estimation Process Observation Unit 121

The class estimation process observation unit 121 observes the calculation process whereby the class of the data to be classified is estimated by the class estimation unit 110, and thereby forms a feature vector. Concrete examples of the calculation process for estimating the class of the data-under-classification observed by the class estimation process observation unit 121 will be described using a neural network, decision tree, and random forest.

When the class estimation unit 110 estimates classes using a neural network, the class estimation process observation unit 121 can use values output from respective nodes (activation functions) of an intermediate layer and output layer of the neural network, as observation data of a calculation process.

Figure 3:
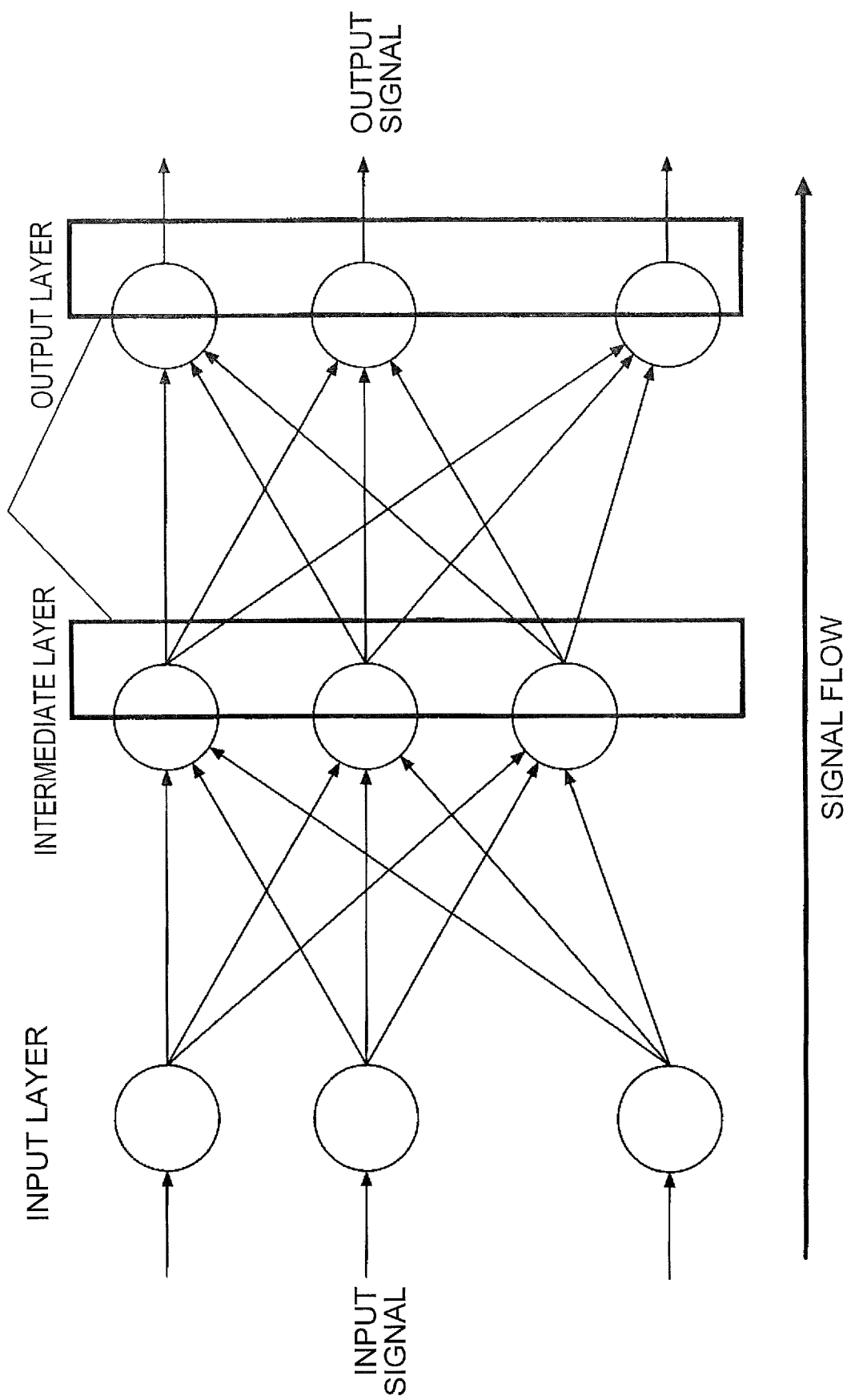
FIG. 3 is a diagram for explaining an operation example of a class estimation process observation unit 121 (when a neural network is used).

An example of a three-layered neural network is shown in FIG. 3. In this example, values output from respective nodes (activation functions) of one of intermediate layers and the output layer of the neural network can be used as observation data of the calculation process. The case in which the neural network is three-layered such as shown in FIG. 3 is only exemplary, and there is no essential difference even if the neural network has four or more layers, except that objects to be observed increases. Note that the shape of the neural network in FIG. 3 is based on a neural network disclosed at "http://ipr20. cs.ehime-u.ac.jp/column/neural/chapter5.html."

In the example shown in FIG. 3, the class estimation process observation unit 121 acquires values output from respective nodes (activation functions) of observation sites, and thereby forms a feature vector. For example, if values of nodes in the intermediate layer are 0.5, 0.4, and 0.7, respectively, while values of nodes in the output layer are 0.2, 0.7, and 0.1, respectively, the feature vector can be formed as [0.5 0.4 0.7 0.2 0.7 0.1].

Figure 4:
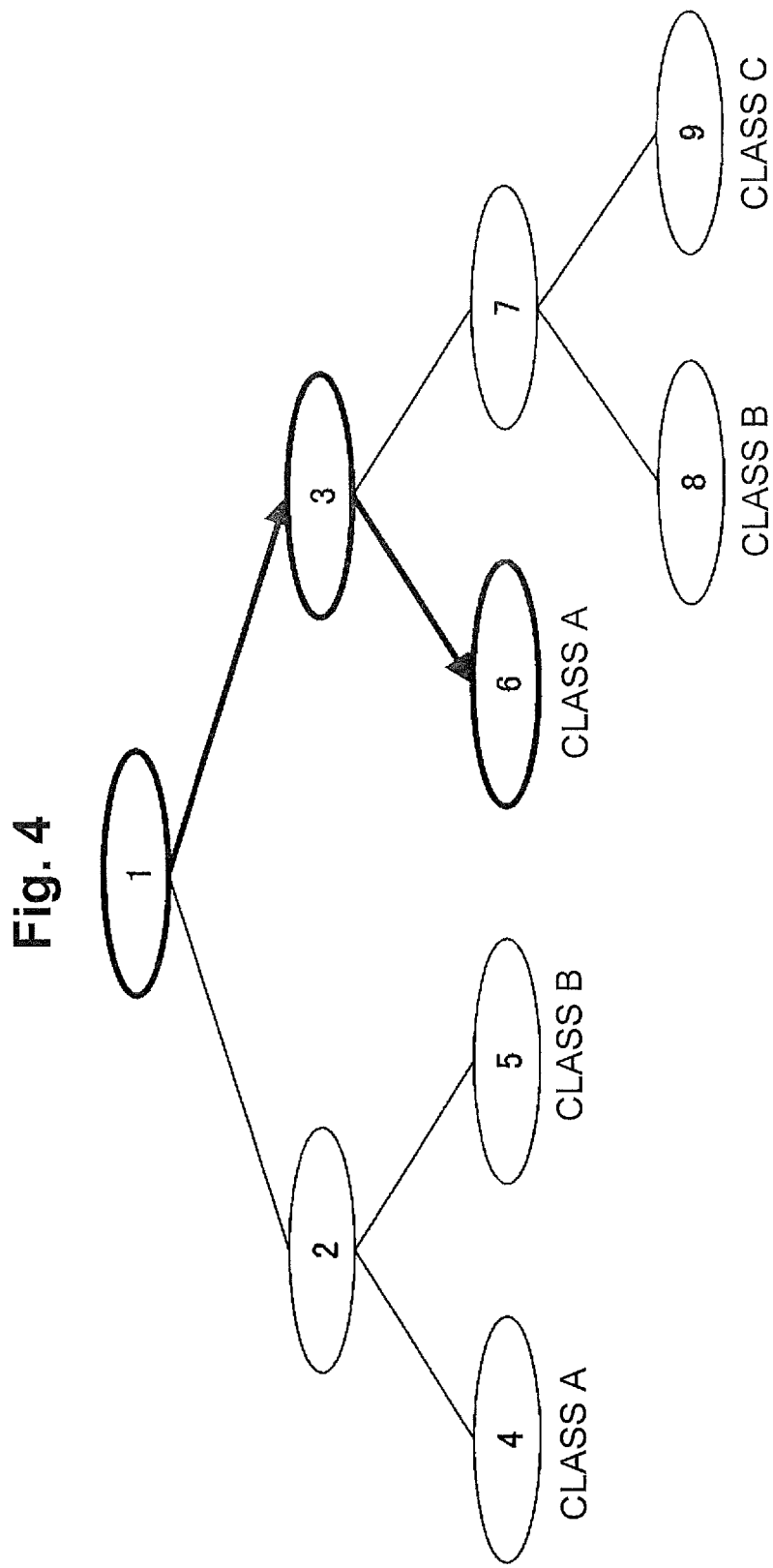
FIG. 4 is a diagram for explaining an operation example of a class estimation process observation unit 121 (when a decision tree is used).

When the class estimation unit 110 estimates classes using a decision tree, the class estimation process observation unit 121 observes a route through which the classification comes to a decision, and thereby forms a feature vector. An example of a decision tree is shown in FIG. 4. This decision tree is configured to estimate any of three classes: class A, class B, and class C.

In the example shown in FIG. 4, when class A is reached along a route: node 1->node 3->node 6, a feature vector formed by the class estimation process observation unit 121 acquiring this data as observation data is [1 0 1 0 0 1 0 0 0]. In this example, superscripts to vector elements correspond to node numbers of the decision tree, and the feature vector is formed such that if a node is passed through, the element corresponding to the node contains 1 and if a node is not passed through, the element corresponding to the node contains 0.

Next, the case where the class estimation unit 110 estimates classes using a random forest will be described. The random forest is a model whereby plural small-scale decision trees are created and classification is made by majority vote. This makes it possible to generate the elements of the feature vectors of the small-scale decision trees using the above-mentioned method for forming a decision tree, and forming the feature vectors by coupling together the vector elements. In addition, the number of votes of each class can be linked to the feature vectors.

Details of Error Determination Unit 122

The error determination unit 122 receives an estimated class from the class estimation unit 110 while receiving a feature vector of observation data in the process of being estimated from the class estimation process observation unit 121 and determines whether the class estimated by the class estimation unit 110 is "correct" or "incorrect" based on the observation data. When the result of the determination is "correct," the class estimated by the class estimation unit 110 is used directly as a classification result, but when the result of the determination is "incorrect," "unclear" is produced as a classification result.

Figure 5:
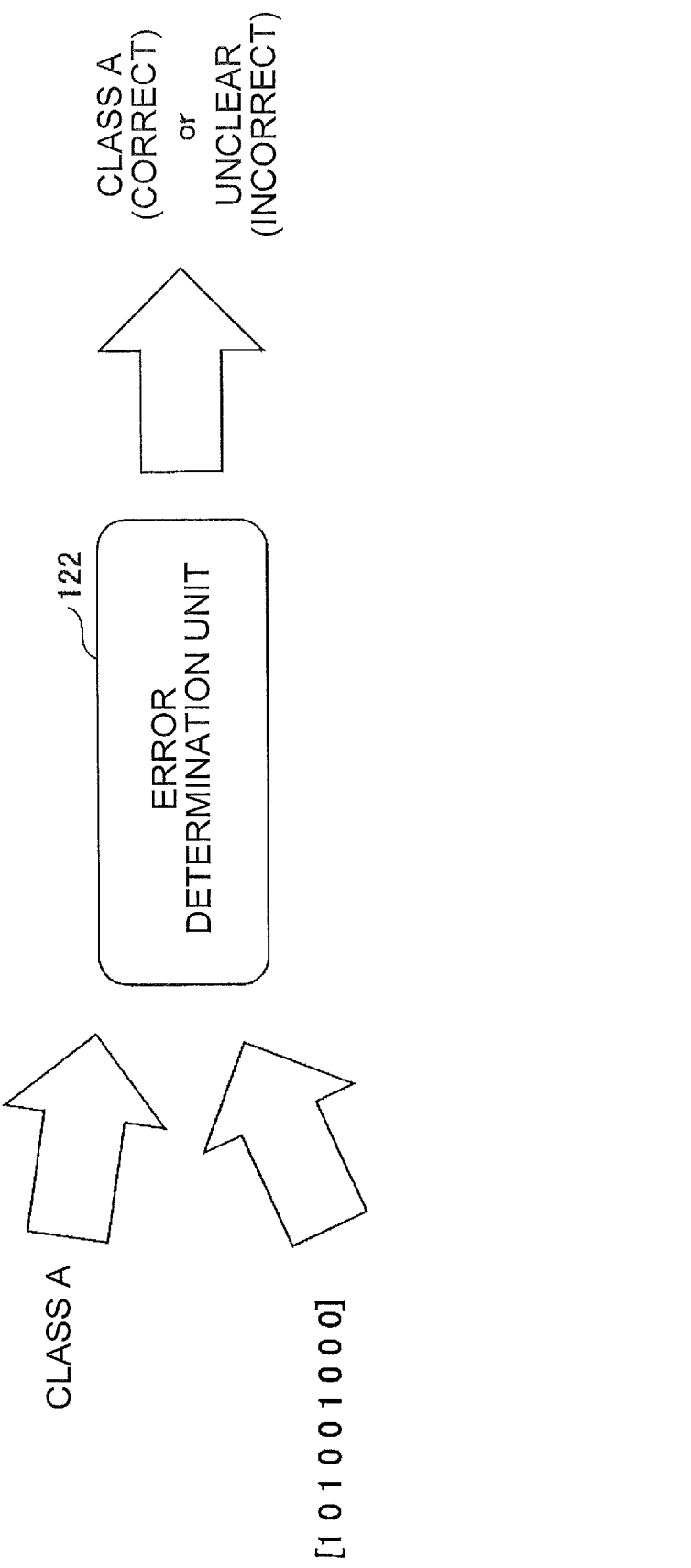
FIG. 5 is a diagram for explaining an operation overview of an error determination unit 122.

FIG. 5 shows a concrete example. In the example of FIG. 5, the error determination unit 122 receives class A and a feature vector [1 0 1 0 0 1 0 0 0], respectively, from the class estimation unit 110 and class estimation process observation unit 121 and determines whether the class A is correct or incorrect based on the received data.

The method for forming the error determination unit 122 is not limited to a specific method. For example, the error determination unit 122 can determine whether classification is "correct" or "incorrect" by determining whether a specific value of a feature vector (the value of the output layer of a neural network or the number of votes in a random forest, in particular) exceeds a threshold.

Also, the error determination unit 122 may be formed using a model commonly used in the field of machine learning. The error determination unit 122 may be formed, for example, of an SVM, a neural network, or the like. When any of these models is used, if model parameters are tuned by supervised learning, the error determination unit 122 can be implemented. A method for creating the error determination unit 122 using machine learning will be described below.

Method for Creating Error Determination Unit 122 Using Machine Learning

Figure 6:
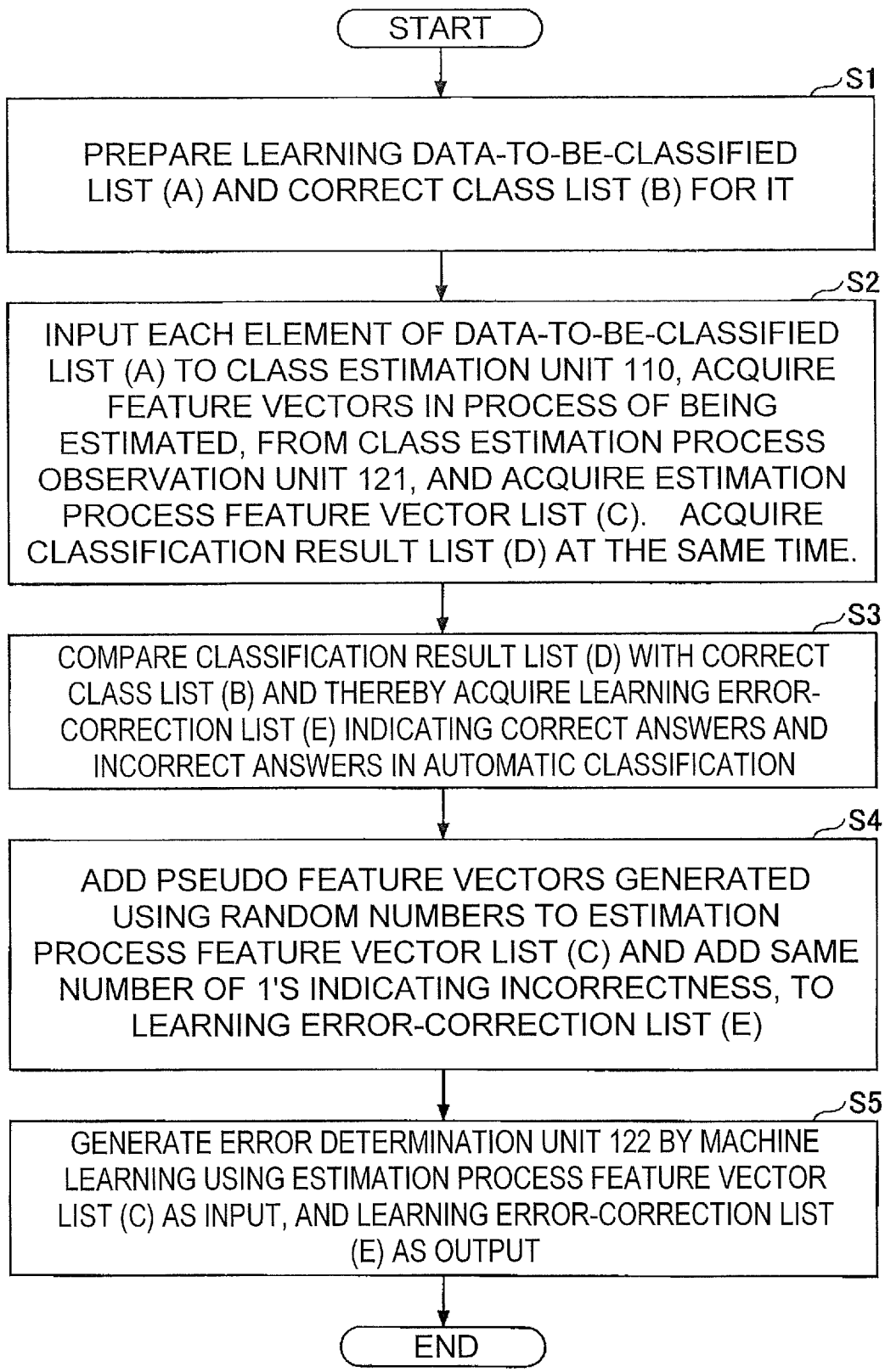
FIG. 6 is a flowchart showing processing procedures for generating the error determination unit 122.

FIG. 6 is a flowchart showing procedures of a method for creating the error determination unit 122 using machine learning. S1 (step 1) to S5 (step 5) will be described below following the procedures shown in FIG. 6.

Note that the process of creating the error determination unit 122 may be performed by a learning unit (or a self-rejection device or error determination device) provided on the classification device 100 or a learning unit provided on a computer other than the classification device 100 (or a self-rejection device or error determination device). Also, the essence of the created error determination unit 122 is a piece of software configured to perform calculations according to mathematical formulas corresponding to a parameter-tuned model.

Step 1

In step 1, a learning data-to-be-classified list (A) and a correct class list (B) for the learning data-to-be-classified list (A) are prepared. When the class estimation unit 110 is being tuned by machine learning, resulting learning data may be utilized in the preparation. The learning data-to-be-classified list (A) and the correct class list (B) therefor need to be prepared manually.

Figure 7:
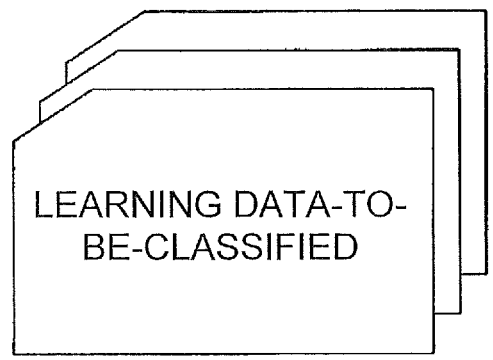
FIG. 7 is a diagram showing the process of S1.

FIG. 7 shows an example of a learning data-to-be-classified list (A) and correct class list (B) therefor. This example shows a learning data-to-be-classified list (A) made up of three items of data and a list (B) (the items in angle brackets) of correct classes for the respective items of data.

Step 2

Figure 8:
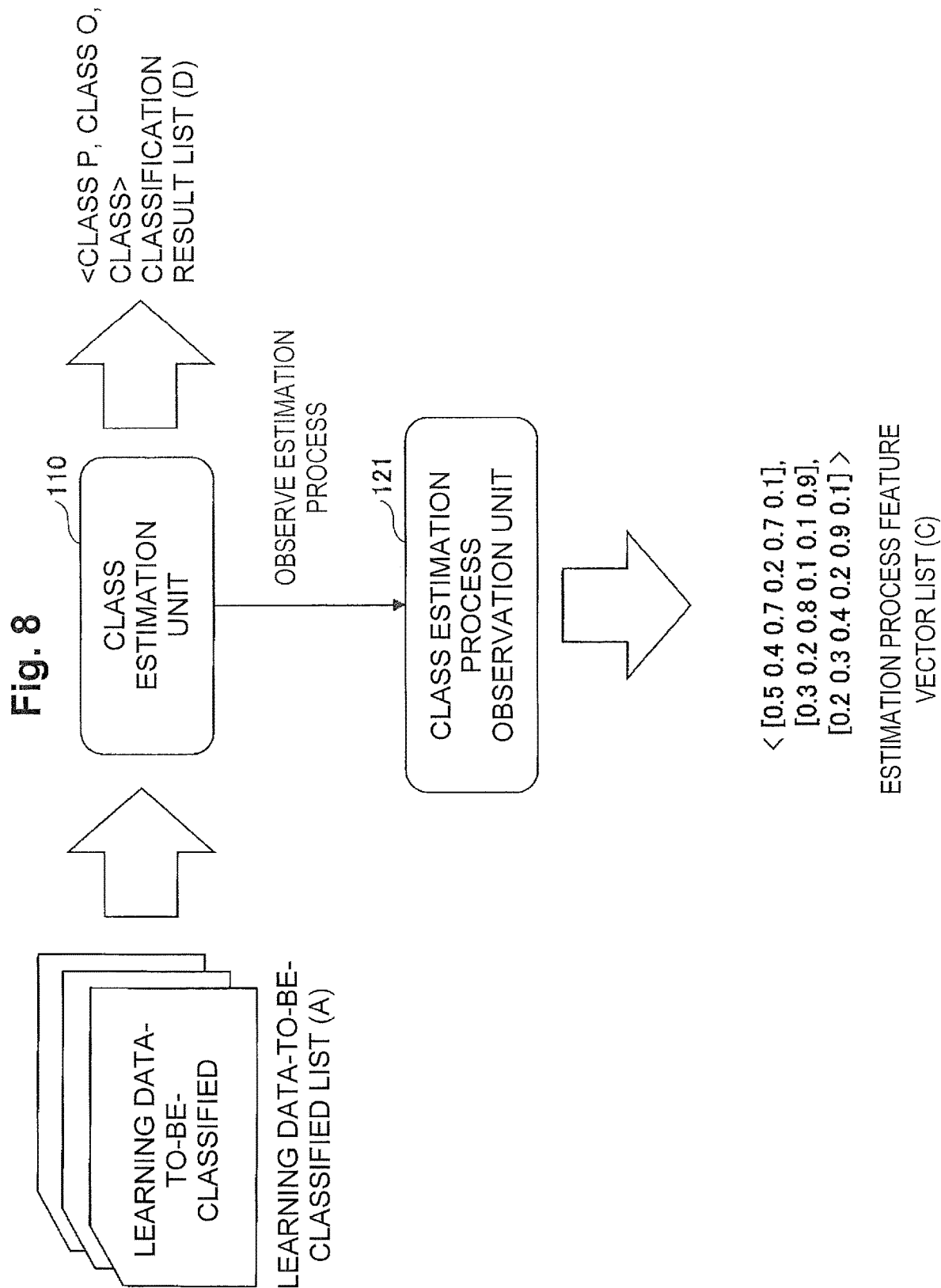
FIG. 8 is a diagram showing the process of S2.

In step 2, as shown in FIG. 8, the respective elements of the data-to-be-classified list (A) are input to the class estimation unit 110. The class estimation process observation unit 121 generates feature vectors in the process of being estimated, using the method described above, and the learning unit acquires an estimation process feature vector list (C), which is a list of the generated feature vectors. At the same time, the learning unit acquires a classification result list (D) from the class estimation unit 110.

Step 3

Figure 9:
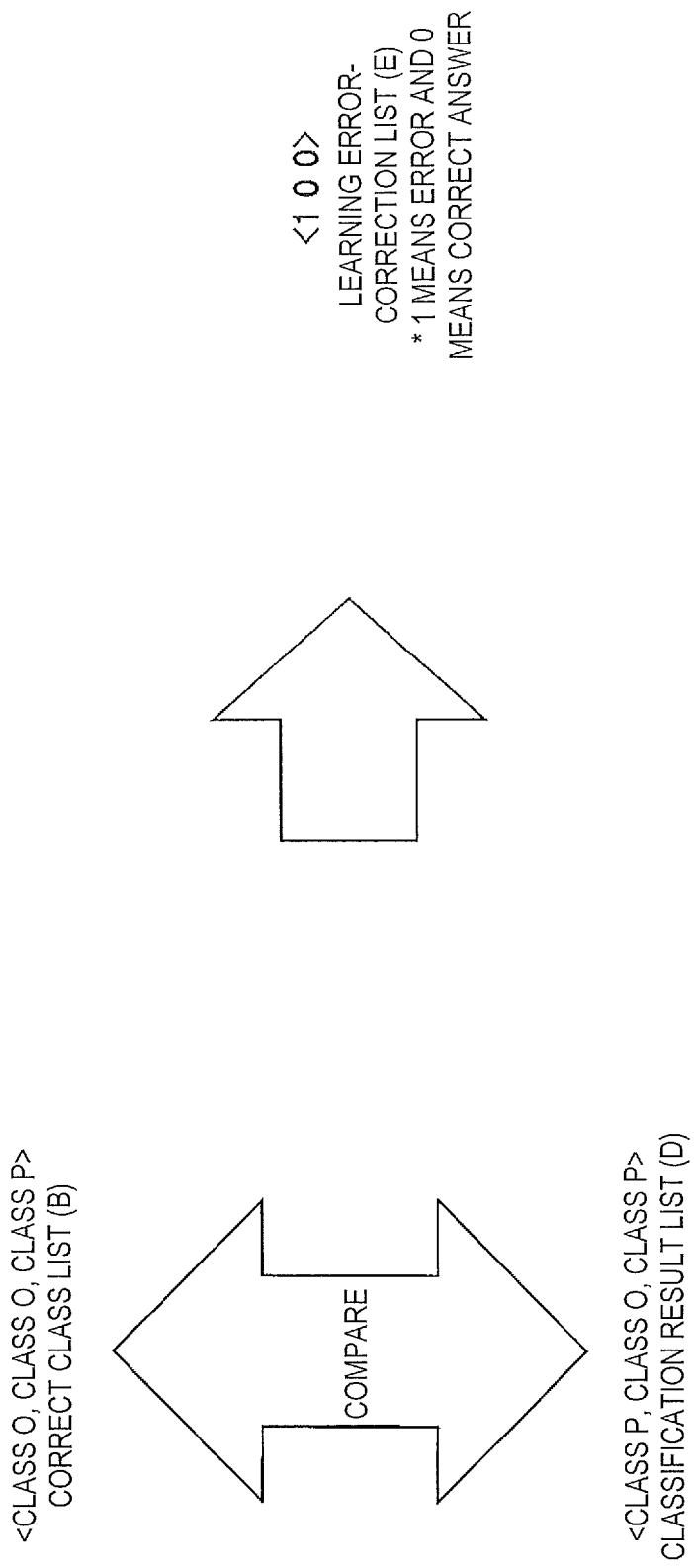
FIG. 9 is a diagram showing the process of S3.

In step 3, as shown in FIG. 9, the learning unit compares the classification result list (D) with the correct class list (B) and thereby acquires a learning error-correction list (E) indicating correct answers and incorrect answers in the automatic classification. In the example of FIG. 9, as shown in the correct class list (B), whereas the correct answer for the first class is class O, the first class in the classification results is class P. Thus, the first class is incorrect, and the first element in the learning error-correction list (E) is 1 (incorrect). Since the second and third classes are correct, the learning error-correction list (E) contains <1 0 0>.

Step 4

Figure 10:
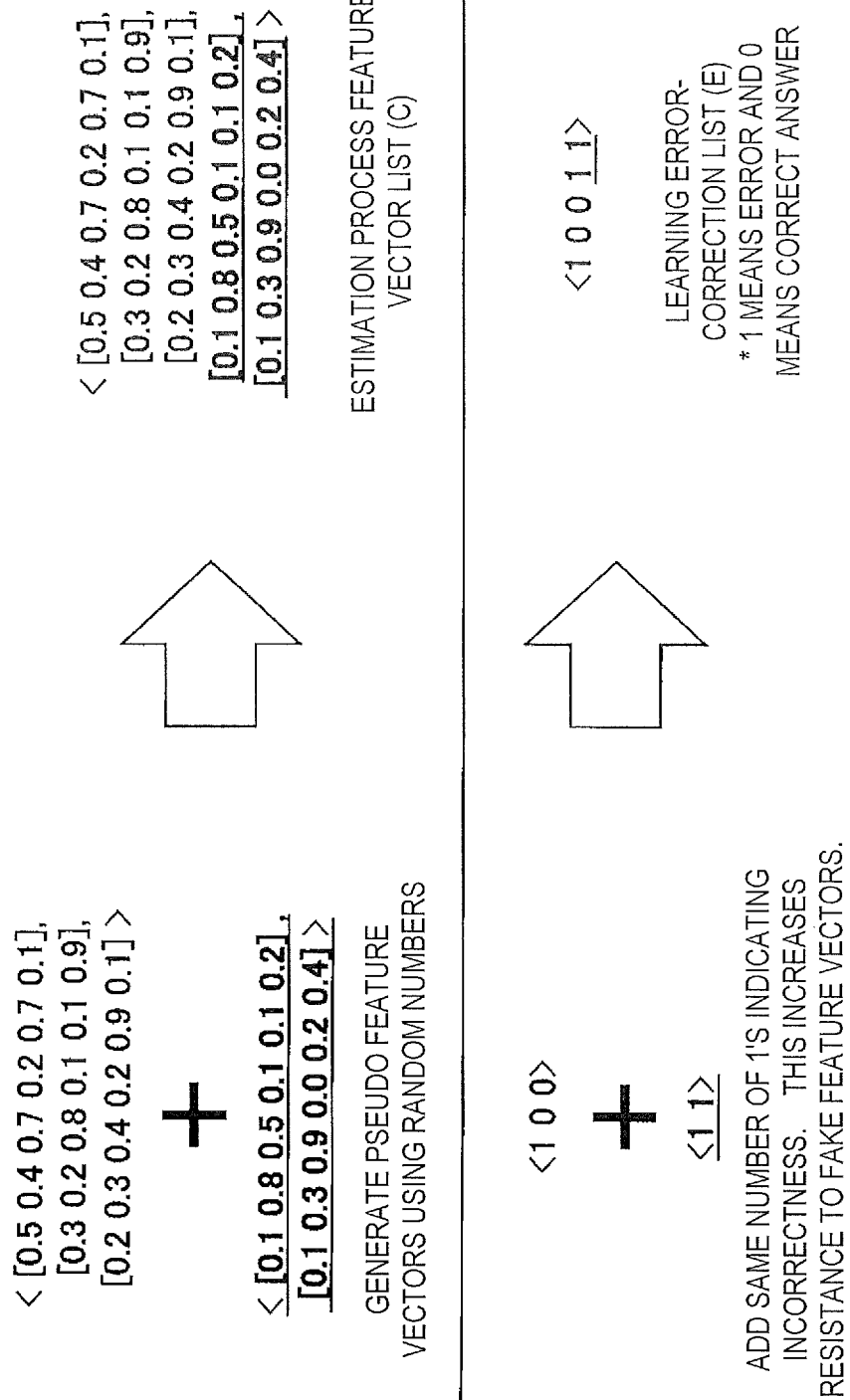
FIG. 10 is a diagram showing the process of S4.

In step 4, as shown in FIG. 10, the learning unit adds pseudo feature vectors generated using random numbers or the like to the estimation process feature vector list (C) and adds the same number of "1's" indicating that the pseudo feature vectors are incorrect to the learning error-correction list (E). In the example shown in FIG. 10, what is added is underlined. As shown in FIG. 10, two pseudo feature vectors are added to the estimation process feature vector list (C) and two "1's" are added to the learning error-correction list (E). Such an addition increases resistance to fake feature vectors and thereby improves accuracy of correct/incorrect determination on threat information having unknown features.

Step 5

In step 5, as shown in FIG. 11, the learning unit does machine learning using, for example, the estimation process feature vector list (C) as an input to a neural network (or SVM), and the learning error-correction list (E) as a correct answer output from the neural network (or SVM). Consequently, a parameter-tuned neural network (or SVM) is obtained as the error determination unit 122.

Effects of Present Embodiment

As has been described above, since the technique according to the present embodiment observes the estimation process during the classification performed by the class estimation unit 110 and makes error determinations based on observation data, the error determinations can be made with high accuracy.

Also, the technique according to the present embodiment makes it possible to separate classes highly likely to be correct from classes unlikely to be correct. This makes it easy to choose not to manually check the classes highly likely to be correct while manually checking the classes unlikely to be correct.

Summary of Embodiment

As has been described above, the present embodiment provides the error determination device. The error determination device includes the class estimation process observation unit configured to acquire data in a process of being estimated, from the class estimation unit; and the error determination unit. The class estimation unit estimates the class of the data to be classified. The class estimation process observation unit generates an estimation process feature vector based on the acquired data. The error determination unit accepts input of the estimation process feature vector generated by the class estimation process observation unit and the classification result output from the class estimation unit and determines whether the classification result is correct or incorrect based on the estimation process feature vector and the classification result. The error determination unit is a functional part generated by machine learning based on an estimation process feature vector list created by adding a pseudo feature vector to an estimation process feature vector list generated by the class estimation process observation unit and on a learning error-correction list indicating that a class corresponding to the pseudo feature vector is incorrect.

The error determination unit outputs the classification result produced by the class estimation unit, for example, when it is determined that the classification result is correct, and outputs information indicating that the class is unclear when it is determined that the classification result is incorrect.

When the class estimation unit is made up of a neural network, the data in the process of being estimated may include output data from a node in an intermediate layer of the neural network, and when the class estimation unit is made up of a decision tree, the data in the process of being estimated may include information about a decision route of the decision tree.

Whereas an embodiment of the present invention has been described above, the present invention is not limited to such a specific embodiment, and various modifications and changes can be made without departing from the spirit and scope of the invention set forth in the appended claims.

REFERENCE SIGNS LIST

100 Classification device
110 Class estimation unit
120 Self-rejection unit
121 Class estimation process observation unit
122 Error determination unit
150 Drive device
151 Recording medium
152 Auxiliary storage device
153 Memory device
154 CPU
155 Interface device
156 Display device
157 Input device

The invention claimed is:

1. An error determination comprisin:
a memory; and
a processor coupled to the memory and configured to:
a) acquire data in a process of being estimated, from a class estimation that estimates a class of data to be classified and generate an estimation process feature vector based on the acquired data; and
b) perform an error determination to accept imput of the estimation process feature vector generated by a) and a classification result output from the class estimation, and to determine whether the classification result is correct or incorrect based on the estimation process feature vector and the classification result, wherein
the error determination is performed by using a functional part that is generated by machine learning based on an estimation process feature list created by addins a pseudo feature vector to an estimation process feature vector list generated by a) and on a learning error-correctio list indication that a class corresponding to the pseudo feature vector is incorrect,
wherein the class estimation is performed by a neural network or by a decision tree, and
wherein when the class estimation is performed by a neural network, the data in the process of being estimated includes output data from a node in an intermediate layer of the neural network, and when the class estimation is performed by a decision tree, the data in the process of being estimated includes information about a decision route of the decision tree.

2. The error determination device according to the claim 1, wherein the processor is further configured to output the classification result produced by the class estimation, when it is determined that the classification result is correct, and to output information indicating that the class is unclear when it is determied that the classification result is incorrect.

3. An error determination method performed by a computer, the method comprising:
 a) acquiring data in a process of being estimated, from a class estimation that estimated a class of data to be classified and generating an estimation process feature vector based on the acquired data; and
 b) accepting input of the estimation process feature vector generated by a) and a classification reult output from the class estimation, and determining whether the classification result, wherein
 a functional part of the computer that carries out b) is generated by machine learning based on an estimation process feature vector list created by adding a pseudo feature vector to an estimation process feature vector list and on a learning error-corection list indicating what a class corresponding to the pseudo feature vector is incorrect, the estimation process feature vector list being generated based on the data in the process of being estimated, where the data in the process of beingestimated is acquired from the class estimation,
 wherein the class estimation is performed by a neural network or by a decision tree, and
 wherein when the class estimation is performed by a neural network, the data in the process of being estimated includes output data from a node in an intermediate layer of the neural network, and when the class estimation is performed by a decision tree, the data in the process of being estimated includes information about a decision route of the decision tree.

4. A non-transitory computer readable medium having a program embodied therein for causing the computer to perform the method of claim 3.

* * * * *